US012803688B2

(12) United States Patent
Arslan et al.

(10) Patent No.: US 12,803,688 B2
(45) Date of Patent: Nov. 17, 2026

(54) FAST NOISE DETECTION

(71) Applicant: Silicon Laboratories Inc., Austin, TX (US)

(72) Inventors: Guner Arslan, Austin, TX (US); Karthi Subbiah, Leander, TX (US); Jin Xu, Round Rock, TX (US)

(73) Assignee: Silicon Laboratories Inc., Austin, TX (US)

( * ) Notice: Subject to any disclaimer, the term of this patent is extended or adjusted under 35 U.S.C. 154(b) by 329 days.

(21) Appl. No.: 18/621,185

(22) Filed: Mar. 29, 2024

(65) Prior Publication Data

US 2025/0310013 A1 Oct. 2, 2025

(51) Int. Cl.
*H04B 17/26* (2015.01)
*H04B 17/309* (2015.01)
*H04B 17/382* (2015.01)

(52) U.S. Cl.
CPC ........... *H04B 17/346* (2023.05); *H04B 17/26* (2015.01); *H04B 17/382* (2015.01)

(58) Field of Classification Search
CPC .... H04B 17/346; H04B 17/26; H04B 17/382; H04B 17/309
See application file for complete search history.

(56) References Cited

U.S. PATENT DOCUMENTS 7,551,904 B2 6/2009 Lee et al.
7,639,047 B1 12/2009 Ang et al.
9,106,485 B1 8/2015 Waheed et al.
9,729,364 B1 8/2017 Rey
9,980,277 B2 5/2018 Dickey et al.
10,014,633 B1 7/2018 Choi et al.
10,278,200 B2 4/2019 Dickey et al.
10,342,028 B2 7/2019 Dickey et al.
(Continued)

FOREIGN PATENT DOCUMENTS

CN 1358003 A 7/2002
CN 101132368 A 2/2008
(Continued)

OTHER PUBLICATIONS

"Single-Chip IEEE 802.11 b/g/n MAC/Baseband/Radio + SDIO," Data Sheet, Broadcom Corporation, 82 pages, Feb. 13, 2015.
(Continued)

*Primary Examiner* — John J Lee
(74) *Attorney, Agent, or Firm* — Nields, Lemack & Frame, LLC

(57) ABSTRACT

A noise detector for use in a wireless network device is disclosed. The wireless network device may be used to scan a plurality of different frequency channels, which may be Bluetooth or Zigbee channels, for example. The noise detector is used to quickly detect the presence of noise on a frequency channel. This quick detection allows the wireless network device to switch to another frequency channel and continue scanning. In some embodiments, the noise detector uses a detection window and counts frequency outliers in that detection window to determine whether a valid signal is present on the wireless channel. The detection window may be fixed in duration, or may grow. Additionally, the detection window may be stationary or may be a sliding window.

20 Claims, 13 Drawing Sheets

(56) References Cited

U.S. PATENT DOCUMENTS

| | | | | |
|---|---|---|---|---|
| 10,667,285 | B2 | 5/2020 | Dickey et al. | |
| 10,764,097 | B1 | 9/2020 | Rey | |
| 11,184,272 | B2 | 11/2021 | Zhou et al. | |
| 11,395,188 | B2 | 7/2022 | Arslan et al. | |
| 11,452,110 | B1 | 9/2022 | Jorgovanovic et al. | |
| 11,611,907 | B2 | 3/2023 | Arslan et al. | |
| 2001/0026598 | A1 | 10/2001 | Porcino | |
| 2002/0141506 | A1 | 10/2002 | Chen | |
| 2005/0063416 | A1 | 3/2005 | Shin et al. | |
| 2006/0015503 | A1 | 1/2006 | Simons et al. | |
| 2008/0002794 | A1* | 1/2008 | Wallace | H04W 52/42<br>375/345 |
| 2008/0043705 | A1 | 2/2008 | Desai et al. | |
| 2008/0287158 | A1 | 11/2008 | Rayzman et al. | |
| 2009/0137206 | A1 | 5/2009 | Sherman et al. | |
| 2009/0176454 | A1 | 7/2009 | Chen et al. | |
| 2009/0247217 | A1 | 10/2009 | Hsu et al. | |
| 2009/0258612 | A1 | 10/2009 | Zhuang et al. | |
| 2009/0291658 | A1 | 11/2009 | Castle | |
| 2010/0322159 | A1 | 12/2010 | Ko et al. | |
| 2011/0169659 | A1 | 7/2011 | Dalla et al. | |
| 2011/0268024 | A1 | 11/2011 | Jamp et al. | |
| 2011/0268051 | A1 | 11/2011 | Tsao et al. | |
| 2011/0310741 | A1 | 12/2011 | Ko et al. | |
| 2013/0007480 | A1 | 1/2013 | Wertheimer et al. | |
| 2013/0058316 | A1 | 3/2013 | Hirsch et al. | |
| 2013/0121329 | A1 | 5/2013 | Desai et al. | |
| 2013/0177043 | A1 | 7/2013 | Wyper et al. | |
| 2013/0225100 | A1 | 8/2013 | Chen et al. | |
| 2014/0050204 | A1 | 2/2014 | Huang et al. | |
| 2014/0254634 | A1 | 9/2014 | Hsu et al. | |
| 2015/0012584 | A1 | 1/2015 | Lo et al. | |
| 2015/0036725 | A1 | 2/2015 | Chen | |
| 2015/0109984 | A1 | 4/2015 | Huang et al. | |
| 2015/0200692 | A1 | 7/2015 | Chiou et al. | |
| 2015/0245372 | A1 | 8/2015 | Desai et al. | |
| 2015/0341078 | A1 | 11/2015 | Lingam et al. | |
| 2016/0234696 | A1 | 8/2016 | Looker et al. | |
| 2016/0365885 | A1 | 12/2016 | Honjo et al. | |
| 2016/0381581 | A1 | 12/2016 | Stanciu et al. | |
| 2017/0188182 | A1 | 6/2017 | Jin et al. | |
| 2017/0288922 | A1 | 10/2017 | Akhavan et al. | |
| 2017/0288932 | A1 | 10/2017 | Kang et al. | |
| 2017/0290035 | A1 | 10/2017 | Dickey et al. | |
| 2017/0290038 | A1 | 10/2017 | Dickey et al. | |
| 2017/0324595 | A1 | 11/2017 | Qiu et al. | |
| 2017/0325252 | A1 | 11/2017 | Dickey et al. | |
| 2017/0373893 | A1 | 12/2017 | Rey | |
| 2018/0242341 | A1 | 8/2018 | Dickey et al. | |
| 2018/0352055 | A1 | 12/2018 | He et al. | |
| 2020/0007366 | A1 | 1/2020 | Gilbert | |
| 2020/0195544 | A1 | 6/2020 | Zhou et al. | |
| 2021/0006448 | A1* | 1/2021 | Zhibo | H04L 27/2675 |
| 2022/0046476 | A1 | 2/2022 | Arslan et al. | |
| 2022/0312271 | A1 | 9/2022 | Arslan et al. | |
| 2024/0188124 | A1* | 6/2024 | Li | H04B 17/309 |

FOREIGN PATENT DOCUMENTS

| | | | |
|---|---|---|---|
| CN | 101547028 | A | 9/2009 |
| CN | 102487609 | A | 6/2012 |
| DE | 102009037528 | A1 | 1/2011 |

OTHER PUBLICATIONS

"IEEE Standards 802.15.2 Part 15.2: Coexistence of Wireless Personal Area Networks with Other Wireless Devices Operating in Unlicensed Frequency Bands," IEEE Computer Society, 115 pages, Aug. 28, 2003.

"AR6102 Wi-Fi solution designed for portable consumer electronics devices," Qualcomm, 3 pages, 2013.

* cited by examiner

FAST NOISE DETECTION

FIELD

This disclosure describes systems and methods for detecting noise quickly on a wireless channel.

BACKGROUND

Bluetooth Low Energy (BLE) is becoming a ubiquitous wireless network protocol, being used for speakers, headphones, printers, and other devices. Additionally, other wireless protocols, such as Zigbee have become popular. Because of this, there are environments where there may be more than one wireless protocol in use.

Consequently, it is desirable to incorporate at least two wireless protocols into one device, wherein this device is able to receive and transmit packets using both protocols.

However, this presents challenges. Bluetooth utilizes three different advertising channels, at different frequencies to transmit advertisements to the network. Further, other wireless protocols, such as Zigbee, use other frequencies. Therefore, to capture all of these advertisements and other packets, it may be necessary to utilize a plurality of receive circuits, each tuned to one or more specific frequencies.

However, this approach is very power intensive, as multiple read circuits are operating simultaneously. Therefore, it would be beneficial if one receive circuit could be used for all of these channels.

When using a single receive circuit, one issue is to ensure that the read circuit is tuned to the appropriate channel when a packet is being transmitted on that frequency. For example, if the read circuit simply cycles at a fixed rate between the various frequencies, it may miss a transmission occurring on a different frequency channel.

Therefore, it would be advantageous if there was a wireless device that includes a single read circuit and is able to scan the different frequency channels quickly, looking for network activity.

SUMMARY

A noise detector for use in a wireless network device is disclosed. The wireless network device may be used to scan a plurality of different frequency channels, which may be Bluetooth or Zigbee channels, for example. The noise detector is used to quickly detect the presence of noise on a frequency channel. This quick detection allows the wireless network device to switch to another frequency channel and continue scanning. In some embodiments, the noise detector uses a detection window and counts frequency outliers in that detection window to determine whether a valid signal is present on the wireless channel. The detection window may be fixed in duration, or may grow. Additionally, the detection window may be stationary or may be a sliding window.

According to one embodiment, a noise detector is disclosed. The noise detector comprises a sample counter to count a number of data points received, wherein each data point represents a frequency value; a frequency comparator to compare each data point to an expected range of values, and to detect frequency outliers as those data points having a frequency value outside the expected range of values; a frequency outlier counter to count a number of frequency outliers; a threshold selector to select a threshold based on the number of data points received; a noise comparator to perform a comparison of the number of frequency outliers to the threshold, wherein, if the number of frequency outliers is greater than the threshold, noise is detected. In some embodiments, the threshold increases for greater numbers of data points received. In some embodiments, the incoming data points are grouped into windows, wherein the threshold is selected based on a number of windows received. In certain embodiments, the frequency outlier counter counts a total number of frequency outliers detected in all of the windows. In certain embodiments, each window comprises 4 microseconds. In certain embodiments, the threshold comparator performs the comparison after each window is completely filled. In some embodiments, the noise detector includes a segment counter, wherein the frequency outlier counter counts a number of frequency outliers per segment. In certain embodiments, the noise comparator performs the comparison of the number of frequency outliers received in the last N segments to the threshold. In certain embodiments, N is initially a first value and changes to a second value, larger than the first value.

According to another embodiment, a noise detector is disclosed. The noise detector comprises a sample counter to count a number of data points received, wherein each data point represents a frequency value; a frequency comparator to compare each data point to an expected range of values, and to detect frequency outliers as those data points having a frequency value outside the expected range of values; a window/segment counter to group the incoming data points into a plurality of segments; a frequency outlier counter to count a number of frequency outliers per segment; and a noise comparator to perform a comparison of the number of frequency outliers in a last N segments to a threshold, wherein, if the number of frequency outliers is greater than the threshold, noise is detected. In some embodiments, N is constant. In some embodiments, N is initially a first value and changes to a second value, larger than the first value.

According to another embodiment, a wireless network device is disclosed. The wireless network device comprises any of the noise detectors described above; a receive circuit to generate the incoming date points; a demodulator to detect a packet and receive the packet; and a scheduler in communication with the noise detector and the demodulator, wherein the scheduler changes a frequency channel of the demodulator so as to scan multiple channels sequentially. In some embodiments, the scheduler changes the frequency channel if the noise detector indicates that noise was detected. In some embodiments, if the scheduler does not receive an indication from the noise detector within a predetermined time, the schedular checks: if the demodulator detects a valid packet. In certain embodiments, if the scheduler does not receive an indication of a valid packet from the demodulator within a second predetermined time, the scheduler changes the frequency channel.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
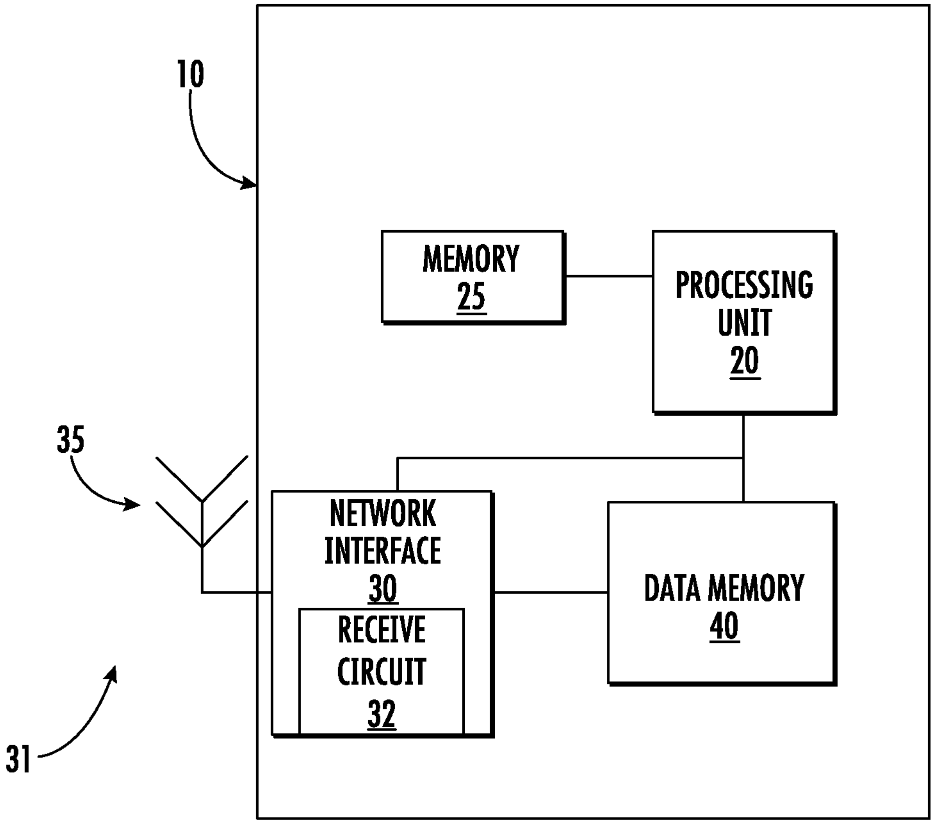
FIG. 1 shows a block diagram of a wireless network device.

FIG. 1 shows a block diagram of a representative network device 10 that is able to cycle quickly between frequency channels according to one embodiment.

The network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable device. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 also includes a network interface 30, which may be a wireless interface that connects with an antenna 35. The network interface 30 may support any wireless network, such as Bluetooth, Wi-Fi, networks utilizing the IEEE 802.15.4 specification, such as Zigbee and Wi-SUN, networks utilizing the IEEE 802.15.6 specification, and wireless smart home protocols, such as Z-Wave. Further, the network interface 30 may also support a proprietary or custom wireless network. The network interface 30 includes a transmit circuit which is used to transmit data from this network device 10 using the antenna 35. The network interface 30 also includes a receive circuit 32 which is used to receive packets.

The network device 10 may include a data memory device 40 in which data that is received and transmitted by the network interface 30 is stored. This data memory device 40 is traditionally a volatile memory. The processing unit 20 has the ability to read and write the data memory device 40 so as to communicate with the other nodes in the wireless network 31. Although not shown, the network device 10 also has a power supply, which may be a battery or a connection to a permanent power source, such as a wall outlet.

While the processing unit 20, the memory device 25, the network interface 30, and the data memory device 40 are shown in FIG. 1 as separate components, it is understood that some or all of these components may be integrated into a single electronic component. Rather, FIG. 1 is used to illustrate the functionality of the network device 10, not its physical configuration.

Figure 2A:
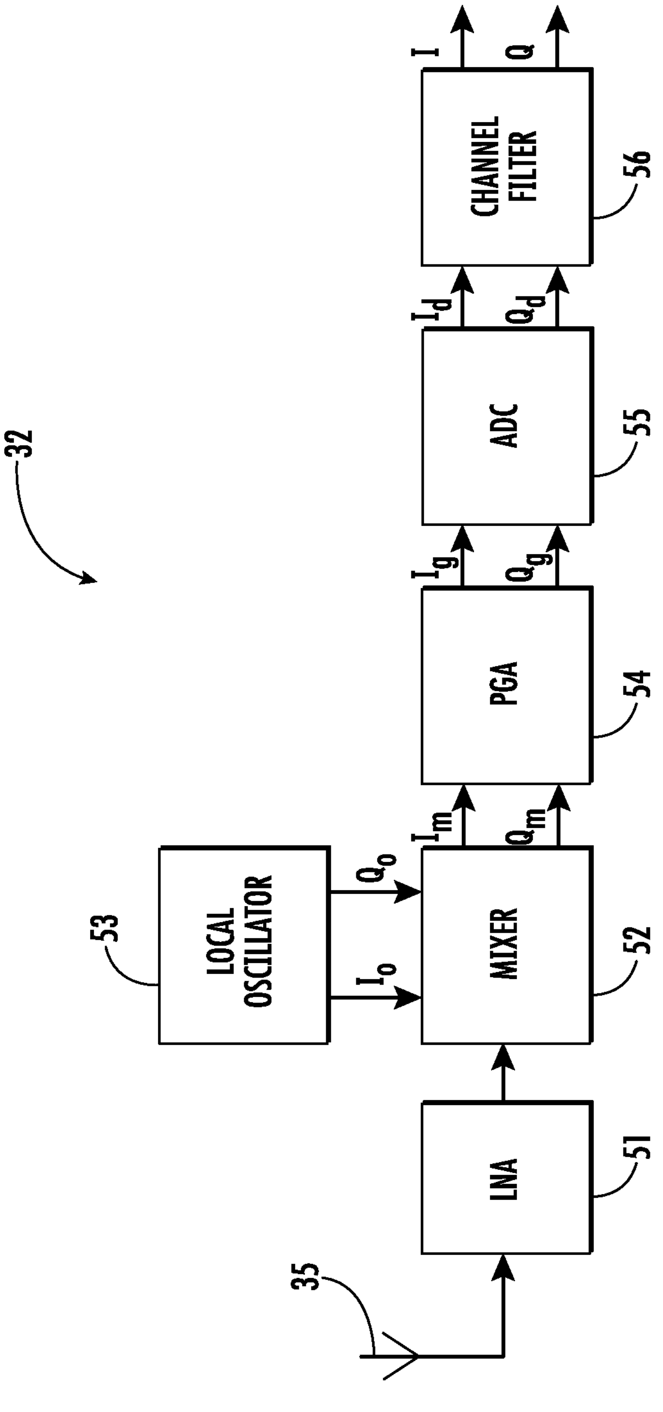
FIGS. 2A-2B show block diagrams of the receive circuit according to one embodiment.
Figure 2B:
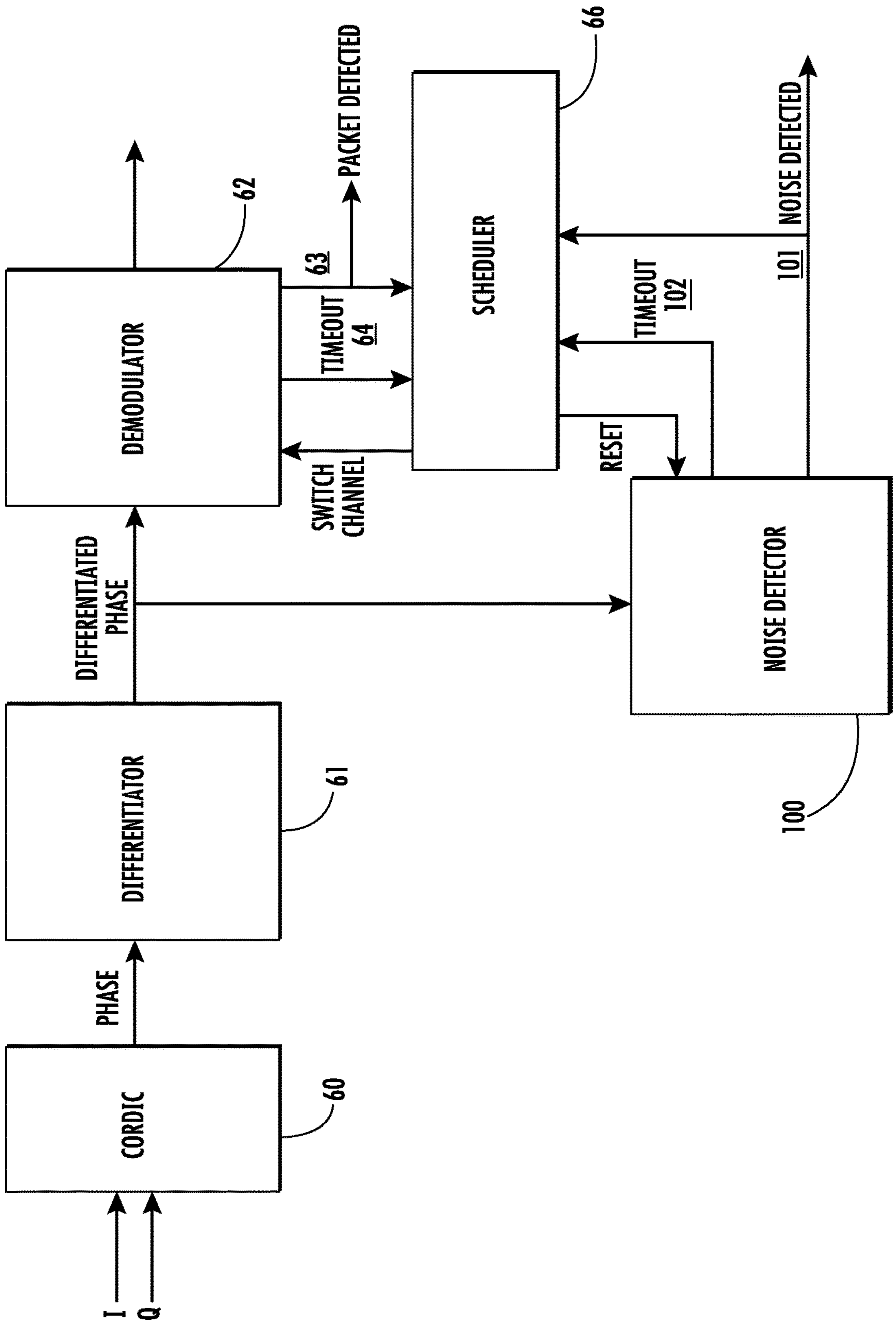

FIG. 2A-2B provide a more detailed illustration of the receive circuit 32 of the network interface 30 according to one embodiment. As shown in FIG. 2A, the wireless signals first enter the network interface 30 through the antenna 35. The antenna 35 is in electrical communication with a low noise amplifier (LNA) 51. The LNA 51 receives a very weak signal from the antenna 35 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sine of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52, are then fed into programmable gain amplifier (PGA) 54. The PGA 54 amplifies the $I_m$ and $Q_m$ signals by a programmable amount. These amplified signals may be referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may then pass through a channel filter 56. The filtered signals are referred to as I and Q. The output of the channel filter 56 may be referred to as the baseband signals. The components that are used to receive the signal from the antenna 35 and produce the baseband signals are referred to as the RF circuit.

These I and Q signals can be used to recreate the amplitude and phase of the original signal. In certain embodiments, the I and Q values may be considered complex numbers, wherein the I value is the real component and the Q value is the imaginary component.

As shown in FIG. 2B, the I and Q signals then enter a phase calculator, such as a CORDIC (Coordination Rotation Digital Computer) 60, which determines the amplitude and phase of the signals. Amplitude is given as the square root of $I^2$ and $Q^2$, while phase is given by the $\tan^{-1}$ (Q/I). In some embodiments, the CORDIC 60 may be a hardware component disposed in the network interface 30. In other embodiments, the CORDIC 60 may be implemented in software. In other embodiments, a different type of phase calculator may be used.

The phase output from the CORDIC 60 is then supplied as an input to the differentiator 61. As is well known, the derivative of phase is frequency. Thus, by determining the difference between the values of two sequential phase values, and optionally dividing the difference by a time duration, a value that is indicative of frequency can be determined. In some embodiments, the differentiator 61 may be a hardware component disposed in the network interface 30. In other embodiments, the differentiator 61 may be implemented in software. The differentiated phase signal may be a signed value, such as an 8-, 16- or 32-bit signed value.

In some embodiments, additional components, which are not shown may also be included in the path from the antenna 35 to the differentiator 61.

The differentiated phase signal is used as an input to a Demodulator 62. The Demodulator 62 may have several functions. First, it may determine the frequency offset (if any) between the incoming data stream and the sample clock used by the network device 10. Another function of the Demodulator 62 may be to detect the preamble pattern. This may be performed by creating a cost function or correlator where a sequence of data samples is compared to the known preamble pattern. Yet another function of the Demodulator 62 may be to identify the synchronization pattern. This can be done by creating a cost function or correlator where a sequence of data samples is compared to the known synchronization pattern. The point at which this cost function is minimized or the correlation score is maximized is identified as the synchronization pattern. The Demodulator 62 then uses this indication to properly align the incoming bits into bytes and receive the packet. Of course, other mechanisms may be used to identify the preamble and/or synchronization patterns. An indication that a valid packet may be present is supplied as an output referred to as the packet detected indicator 63. Further, the Demodulator 62 may provide a timeout signal 64 to indicate that it did not detect a signal that may be a valid packet within a predetermined time period. These signals may be used by the scheduler 66.

The differentiated phase signal is also used as an input to the noise detector 100. The noise detector 100 is a hardware circuit that is used to quickly determine whether the incoming signal contains actual data or is simply noise. Specifically, the noise detector 100 checks for noise within a detection window. The noise detector 100 may include a collection of semiconductor devices, such as adders, comparators, multiplexers and other functions, that execute the processes shown in the accompanying flowcharts. In another embodiment, the noise detector 100 may include a small processing unit to execute the process shown in the accompanying flowcharts.

The differentiated phase signal received from the differentiator 61 is oversampled. This implies that multiple samples are taken for each possible bit of data. For example, if the maximum data rate is 2 Mbps, an oversample rate of 8 MHZ (four times oversampling) or 10 MHz (5 times oversampling) may be used.

In certain embodiments, any frequency offset is subtracted from these frequency values. Removing the frequency offset may allow better analysis of the incoming signal. This may be done by calculating the average positive frequency of all of the data points having a positive value, calculating the average negative frequency of all of the data points having a negative value, and then taking the average of the average positive frequency and the average negative frequency. This average value may be referred to as the frequency offset. This average value may then be subtracted from all of the data points in the window. Note that in some embodiments, the frequency offset is removed prior to the noise detector 100, such that the values received by the noise detector 100 have any frequency offset removed. In other embodiments, the frequency offset is not removed.

Having processed the data points in the window, the noise detector 100 may then check for noise. For example, if the frequency value of a data point is outside a predetermined range, this may be indicative of noise. For example, Zigbee and BLE utilize 2 FSK (2 Frequency Shift Keying), which modulates the carrier frequency (Fc) by a deviation frequency (Fd), resulting in signals with frequencies between Fc−Fd and Fc+Fd. After filtering and processing to remove the carrier frequency, the data points in the window should have values that correspond roughly to frequencies between −Fd and +Fd.

Figure 3:
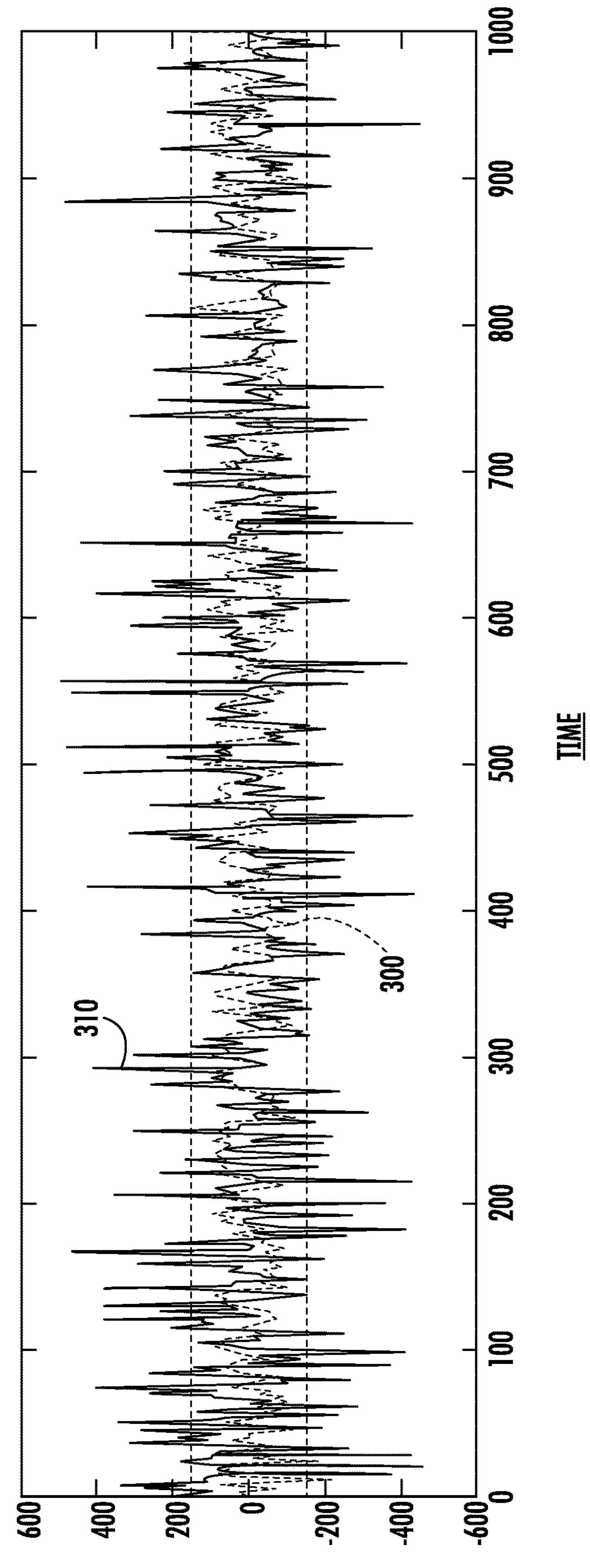
FIG. 3 shows a graph showing frequency values for noise and a valid wireless signal.

FIG. 3 shows the data points after processing and filtering. For illustrative purposes, FIG. 3 shows more than one window of data. The vertical axis represents values that are indicative of frequency. In this graph, the number 64 is used to represent +Fd and −64 represents −Fd. The dotted lines represent the threshold used to detect a frequency outlier. In certain embodiments, this threshold is programmable and may be set to any desired value. For example, in some embodiments, it may be set to a value that is 2.5 times the +Fd and −Fd values. In this graph, line 300 represents actual data. Note that the line 300 remains within the range defined by the two dotted lines. The line 310 represents the lack of a valid signal and has frequency values well in excess of +Fd and −Fd. In fact, these values are in excess of +200 and −200 (in other words, more than twice +Fd and −Fd).

Thus, if the data points have values that indicate frequencies well above +Fd or well below −Fd, this may be indicative of noise. In certain embodiments, the noise detector 100 allows some amount of margin, such as 80-200%. In the case of 100% margin, frequency outliers are those frequency values that are greater than twice +Fd or less than twice −Fd. This amount of margin, which may be programmable, is denoted as max margin. If the max margin is a value greater than 1, then each point having a frequency above max margin*+Fd or below max margin*−Fd may be referred to as a frequency outlier.

The noise detector 100 operates by counting the number of these frequency outliers within a predetermined detection window. If the number of frequency outliers exceeds some predetermined threshold, the noise detector 100 provides an output 101 that indicates that noise has been detected. This output 101 may be provided to the scheduler 66. The scheduler 66 may be implemented in software by the processing unit 20, or by some special purpose hardware component. This output 101 is used to notify the scheduler 66 that it may switch to another frequency channel or different wireless network protocol since a valid signal is not present on this channel. Additionally, the noise detector 100 may provide a timeout signal 102, that indicates that noise was not detected during the predetermined time period. This signal may also be used by the scheduler 66.

The scheduler 66 is used to determine when to update the configuration of the receive circuit 32 and the demodulator 62. For example, the scheduler 66 may include outputs to the demodulator 62 that indicate when the frequency channel of the demodulator 62 should be updated, and optionally may also include the configuration information to be used by the demodulator 62, such as network protocol, frequency, oversample rate, and others. Additionally, as noted above, the scheduler 66 receives the output 101 from the noise detector 100. The scheduler 66 may also include a control signal that is sent to the noise detector 100, which is used to reset or restart the operation of the noise detector 100. Finally, the scheduler 66 may also receive an output from the demodulator 62 that is indicative that a valid packet has been detected. This packet detected indicator 63 may be in the form of a preamble detection signal, a synchronization detection signal, or another type of output.

Figure 4:
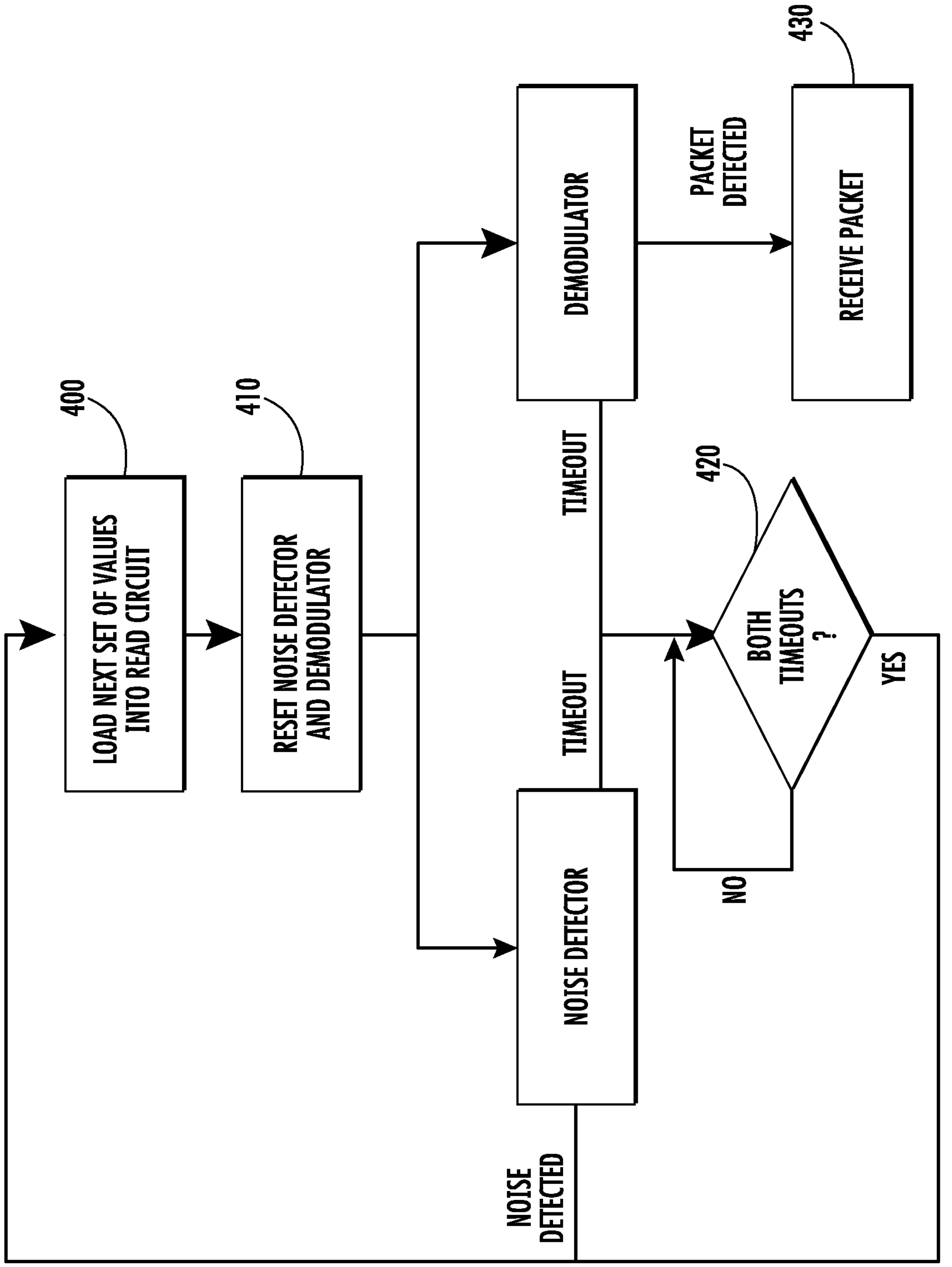
FIG. 4 shows the operation of the read circuit while scanning between various frequency channels.

FIG. 4 shows how the noise detector 100 cooperates with the scheduler 66 and the rest of the receive circuit 32 to receive packets. First, as shown in Box 400, the receive circuit 32 and the demodulator 62 are initialized by the scheduler 66 with the parameters needed to receive a signal on a first frequency channel. This may be a Bluetooth channel, such as one of the Bluetooth advertising channels. Alternatively, it may be a Zigbee channel or a channel on some other wireless protocol. These parameters may include the setting of bandwidth, center frequency, oversample rate, and others. Then, the scheduler 66 resets the noise detector 100 and the Demodulator 62, as shown in Box 410. As described herein, the noise detector 100 is used to check for noise. As noted above, the noise detector 100 may count the number of frequency outliers within a detection window. There are two possible results from the noise detector 100. If, after the completion of a predetermined time period, the noise detector 100 does not detect noise, the noise detector 100 reports a timeout. However, if the noise detector 100 determines that there is noise, the receive circuit 32 is updated by the scheduler 66 with a new set of parameters and moves to the next frequency channel, as shown in Box 400. If the noise detector 100 does not determine that there is noise within some predetermined time period, such as 16 μsec, the scheduler 66 moves to Decision Box 420. While the noise detector 100 is checking for noise, the received data is simultaneously being processed by the demodulator 62. Specifically, the demodulator 62 may be used to determine whether a pattern that may represent a valid packet is present. If the demodulator detects a valid packet has been detected, then the rest of the packet is received, as shown in Box 430. If the demodulator does not detect a valid packet within some predetermined time period, then the scheduler moves to Decision Box 420. If both components have reported timeouts, then the receive circuit 32 is updated by the scheduler 66 with a new set of parameters and moves to the next frequency channel. Note that if, while the packet is being received (see Box 430), the demodulator 62 detects an error, such as an invalid byte count, the scheduler 66 may switch to the next frequency channel. Further, in some embodiments, the predetermined time period used by the noise detector 100 may be shorter than that required by the Demodulator 62, such that the scheduler 66 remains in Decision Box 420 waiting for the demodulator 62 to complete its operation. However, other embodiments are possible. For example, the noise detector 100 may use a predetermined time period that is as long or longer than that required by the Demodulator 62. In this scenario, the scheduler 66 may remain in Decision Box 420 waiting for the noise detector 100 to complete its operation.

Figure 5:
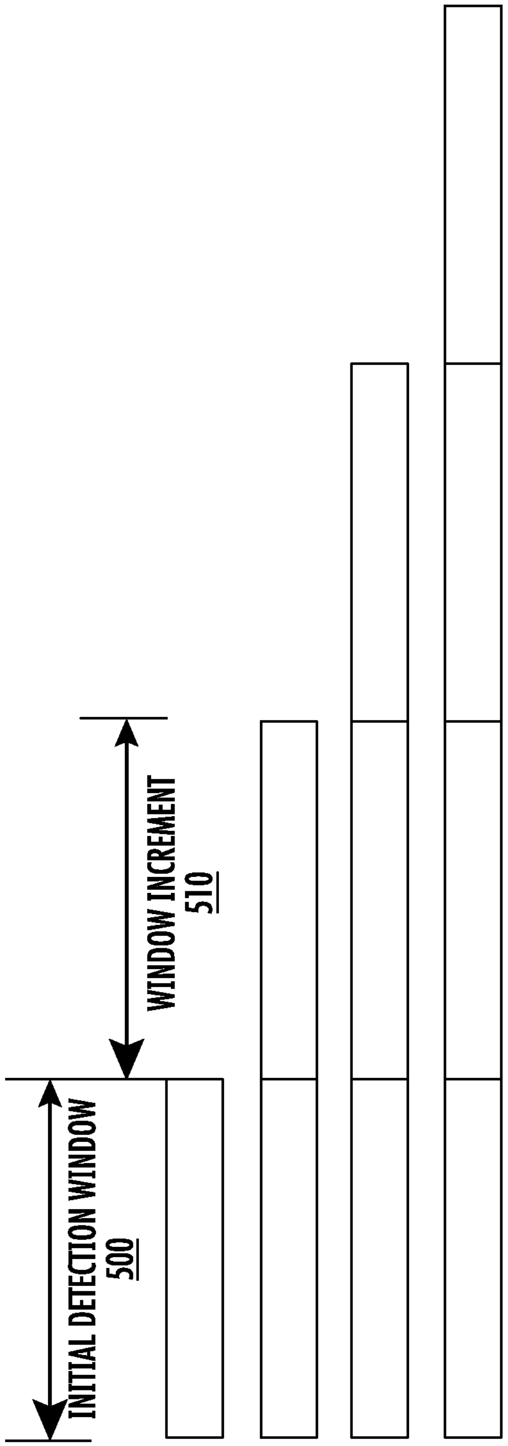
FIG. 5 shows the detection window according to one embodiment.
Figure 6:
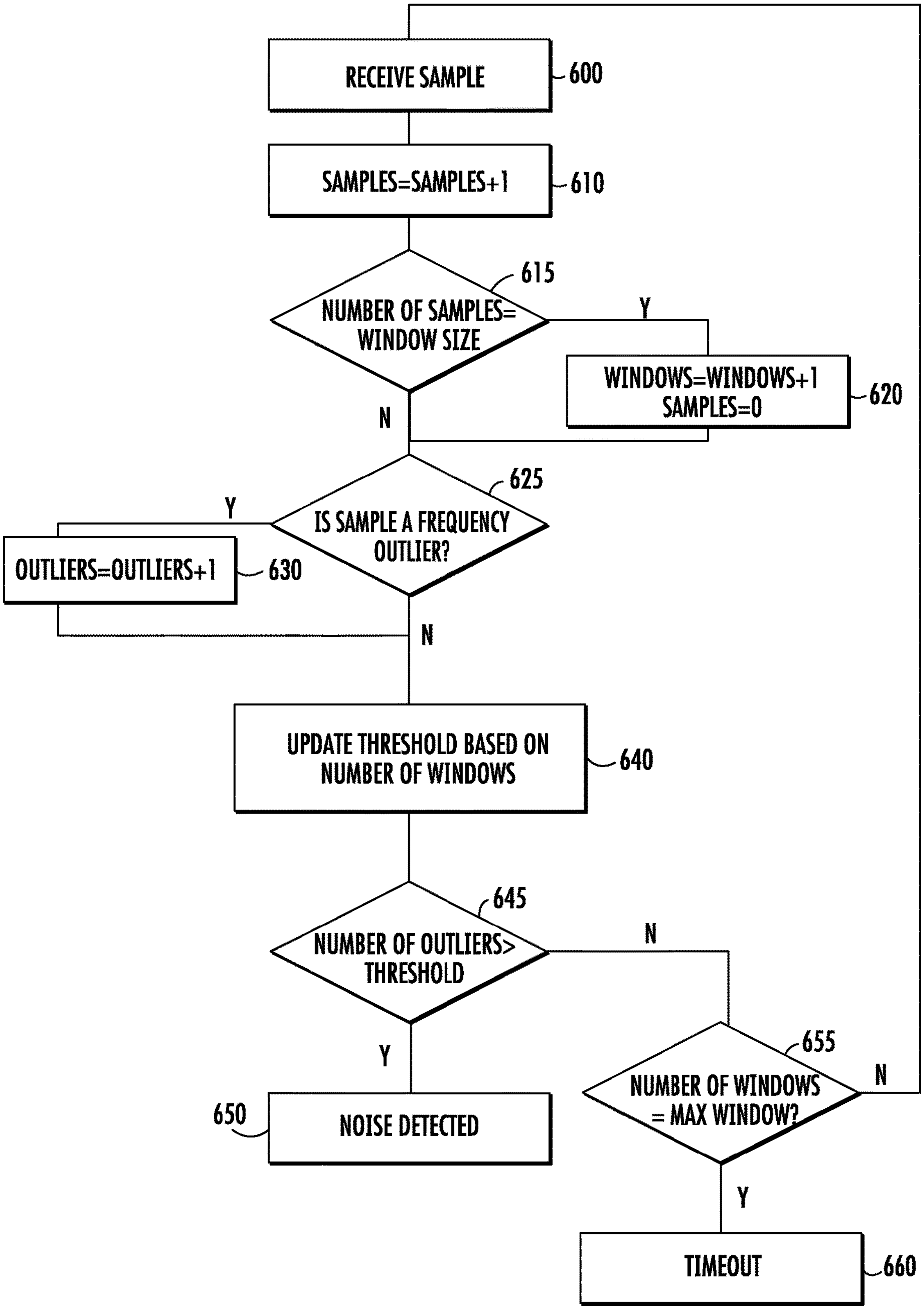
FIG. 6 shows the operation of the noise detector when using the detection window of FIG. 5.

A detailed description of the noise detector 100 is now provided. As explained above, the noise detector 100 operates by counting the number of frequency outliers within a window. FIG. 5 shows one embodiment of the noise detector 100, which utilizes an incremental detection window. The term "incremental detection window" refers to an expanding detection window, which begins with an initial detection window 500 having a first duration and continues to grow unless noise is detected. The detection window may grow by a duration referred to as the window increment 510, which may be the same duration as the initial detection window 500 or may be a different duration. As the size of the detection window grows, the number of frequency outliers that are acceptable also grows. For example, the noise detector 100 may be configured to detect noise if there are 4 frequency outliers within the first 4 μsec. If there is no noise, the noise detector 100 may then update the threshold to detect noise if there are 8 frequency outliers within the first 8 μsec. FIG. 6 shows a flowchart which explains the operation of the noise detector 100 when utilizing an incremental detection window.

First, as shown in Box 600, a new sample is received. As described above, this sample may be a value that represents a frequency of the incoming signal. Then, in Box 610, the number of samples received is incremented. Decision Box 615 checks if the number of samples is equal to the size of a window. If so, the number of windows received is incremented and the sample count is reset, as shown in Box 620. In either scenario, the noise detector 100 then compares the sample to the allowable frequency values, as explained above and shown in Decision Box 625. If the sample is outside the allowable frequency range, the number of frequency outliers is incremented, as shown in Box 630. The threshold is updated based on the number of windows that have been received, as shown in Box 640. Note that the threshold may be updated earlier, such as after Box 620, if desired. The noise detector 100 then compares the number of frequency outliers to the threshold, as shown in Decision Box 645. If the number of frequency outliers exceeds the threshold, the noise detector 100 reports that noise has been detected, as shown in Box 650. If the number of frequency outliers is less than the threshold, the noise detector 100 checks if all of the windows have been received, as shown in Decision Box 655. If so, the noise detector 100 terminates operation and reports a timeout, as shown in Box 660. Thus, in this embodiment, the predetermined time period described in FIG. 4 refers to the maximum number of windows that are combined to form the final detection window used by the noise detector 100. If all of the windows have not been received yet, the sequence is repeated.

Note that the flowchart shown in FIG. 6 may be modified. For example, the noise detector 100 may utilize the number of samples (rather than the number of windows) to determine the appropriate threshold to use. This may allow finer resolution, if desired. Further, in certain embodiments, the number of frequency outliers are only compared to the threshold after a full window has been received.

Figure 7:
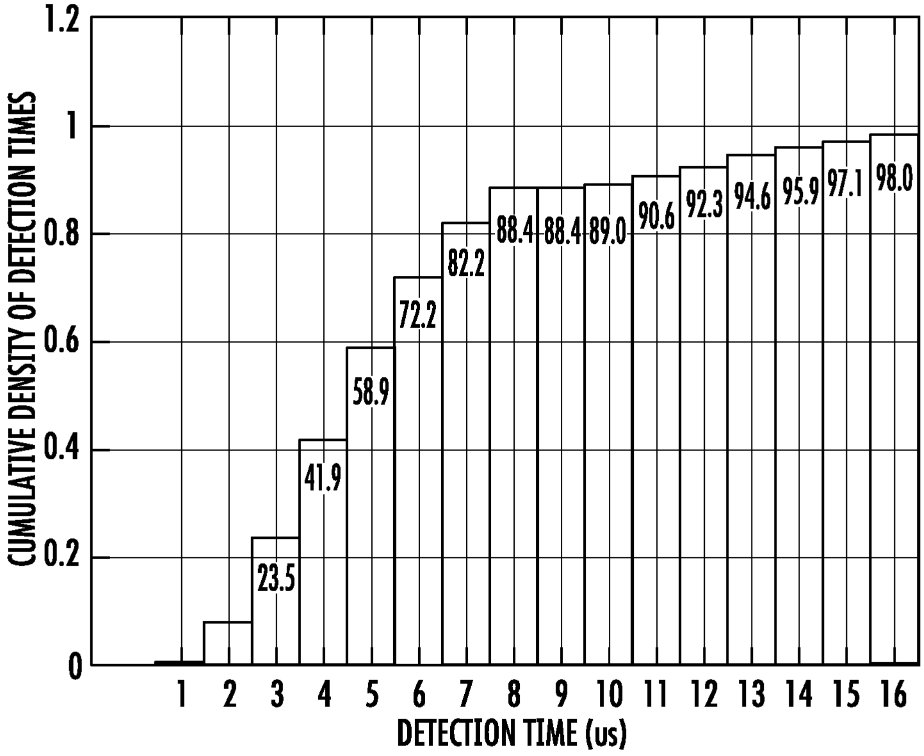
FIG. 7 is a graph of cumulative detection rate versus detection time using the noise detector of FIG. 6.

FIG. 7 shows the benefits of this approach when attempting to detect a Bluetooth signal. The vertical axis represents the cumulative detection rate, defined as the rate at which the presence of noise is correctly identified. The horizontal axis represents the detection time. Note that the detection rate is relatively low at detection times less than 6 μsec, but increases to over 80% at detection times of 8 μsec or more. Further, referring back to FIGS. 5-6, the window may be set to any desired value. For example, in some embodiments, the noise detector 100 may operate on up to sixteen 1 μsec windows, such that the threshold changes as the number of windows increases. In other embodiments, the noise detector 100 may operate on up to eight 2 μsec windows or four 4 μsec windows.

As an example, the noise detector 100 may operate using a detection window of 16 μsec, wherein the threshold for frequency outliers is changed every 1, 2 or 4 μsec. For example, a first threshold is used for times less than 2 μsec, a second threshold is used for times between 2 and 4 μsec, and so on.

Figure 8:
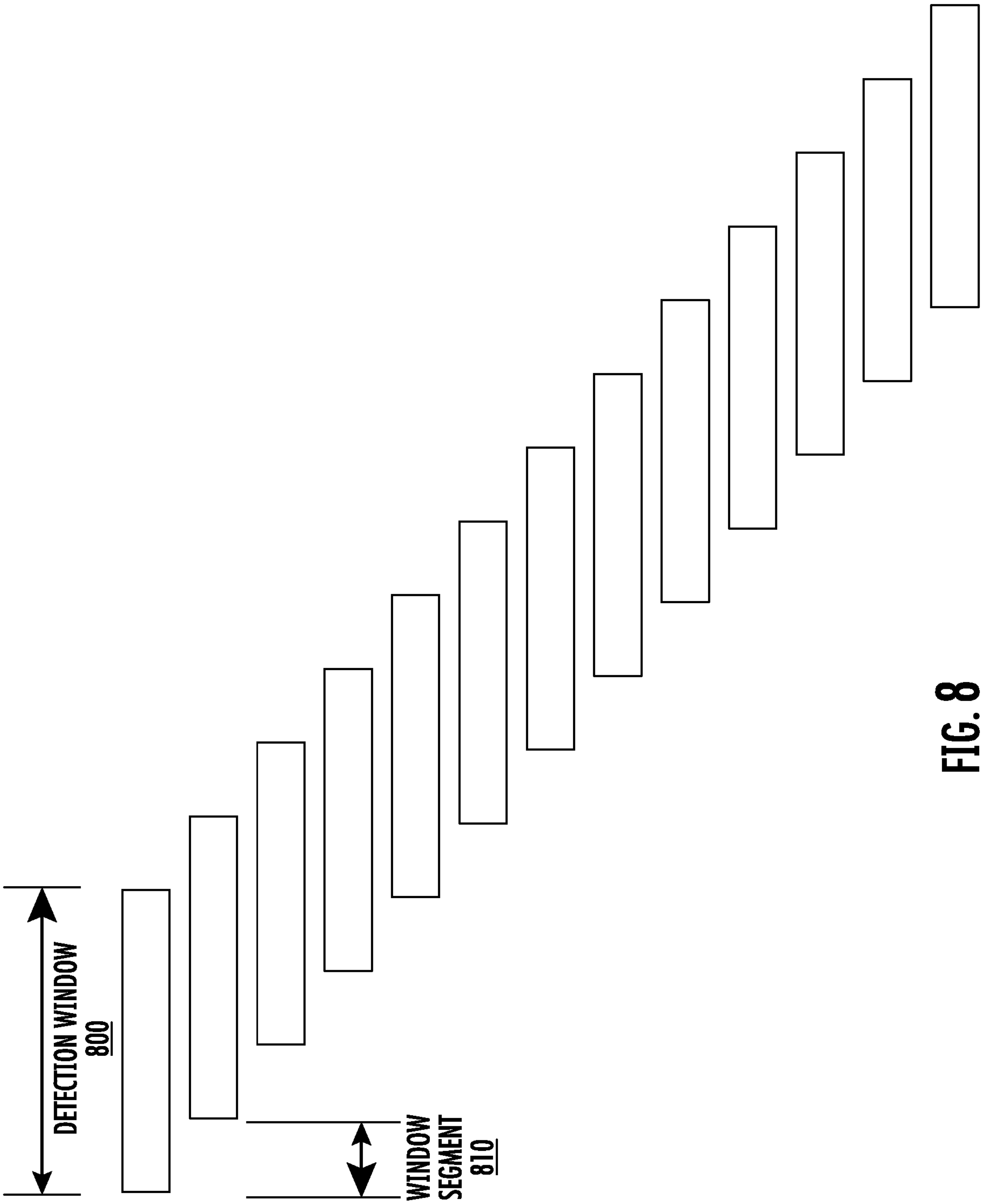
FIG. 8 shows the detection window according to a second embodiment.
Figure 9:
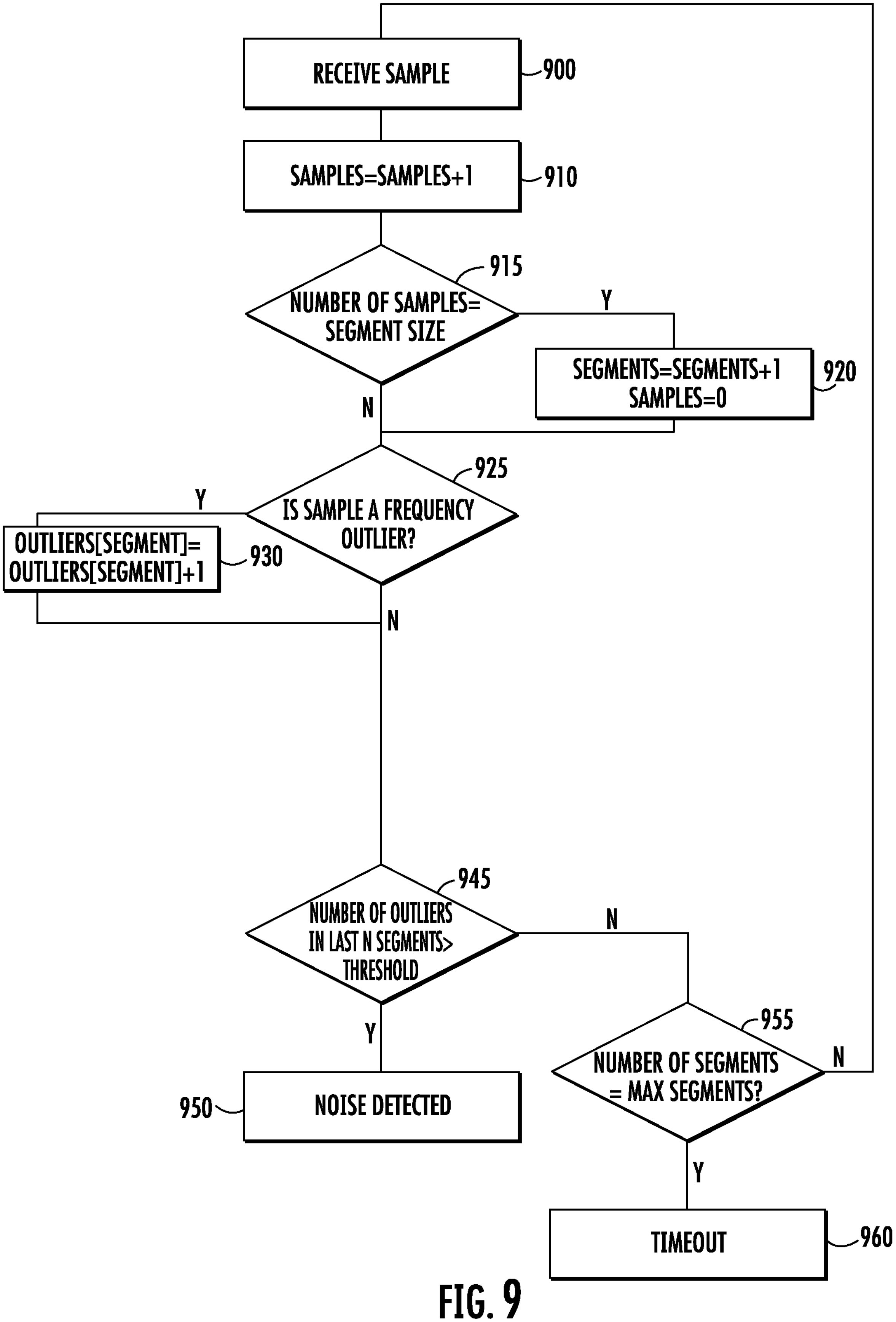
FIG. 9 shows the operation of the noise detector when using the detection window of FIG. 8.

Note that other detection schemes may be used. For example, a sliding detection window may be used. FIG. 8 shows an example of a sliding detection window. In this embodiment, a detection window 800 is made up of one or more window segments 810, such that the detection window 800 equals N window segments 810. Further, the detection window 800 slides by an amount equal to one window segment 810. Thus, the size of the detection window 800 is fixed, but its position in time moves. FIG. 9 shows a flowchart that details this operation. First, as shown in Box 900, a new sample is received. As described above, this sample may be a value that represents a frequency of the incoming signal. Then, in Box 910, the number of samples received is incremented. Decision Box 915 checks if the number of samples is equal to the size of a window segment 810. If so, the number of window segments received is incremented and the sample count is reset, as shown in Box 920. In either scenario, the noise detector 100 then compares the sample to the allowable frequency values, as explained above and shown in Decision Box 925. If the sample is outside the allowable frequency range, the number of frequency outliers for this window segment is incremented, as shown in Box 930. The noise detector 100 then compares the number of frequency outliers received in the last N window segments to the threshold, as shown in Decision Box 945. If the number of frequency outliers exceeds the threshold, the noise detector 100 reports that noise has been detected, as shown in Box 950. If the number of frequency outliers is less than the threshold, the noise detector 100 checks if all of the window segments 810 have been received, as shown in Decision Box 955. If so, the noise detector 100 terminates operation and reports a timeout, as shown in Box 960. If all of the window segments have not been received yet, the sequence is repeated. Thus, in this embodiment, the predetermined time period described in FIG. 4 refers to the maximum number of window segments 810 that are processed before the noise detector 100 reports a timeout.

Note that the number of window segments that are in a detection window is implementation specific and is not limited by this disclosure. In some embodiments, N is greater than 1. For example, in one specific embodiment, the detection window 800 may be 4 or 8 μsec, while each window segment 810 may be 1 μsec or 2 μsec.

Further, as noted above, in some embodiments, the number of frequency outliers is compared to the threshold only after a full window segment has been received. In other embodiments, such as described above, the number of frequency outliers is compared to the threshold after each sample.

Further, in another embodiment, the previous two concepts may be combined such that the detection window grows in duration and then slides. In this embodiment, shown in FIG. 10, there is an initial detection window 1000, which has a first duration and is made up of one or more (N) window segments 1010. This initial detection window 1000 may grow in duration, similar to that described in FIGS. 5-6, to a final detection window 1020. After reaching this duration, the final detection window 1020 then slides by one window segment 1010, as explained in FIGS. 8-9. For example, in one embodiment, the initial detection window 1000 may be 4 μsec, the final detection window 1020 may be 8 or 12 μsec and the window segment 1010 may be 1 μsec or 2 μsec.

Figure 10:
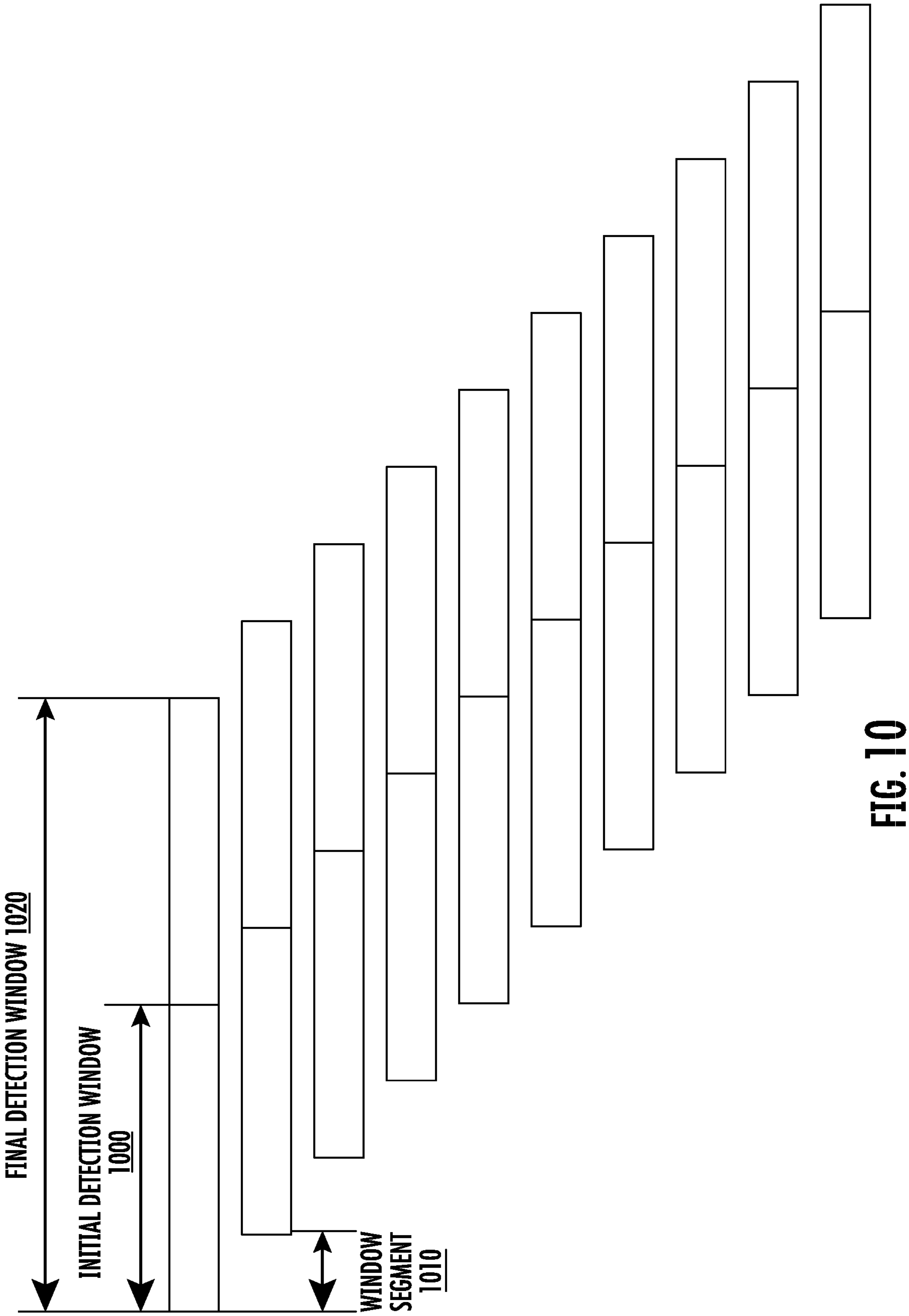
FIG. 10 shows the detection window according to a third embodiment.
Figure 11:
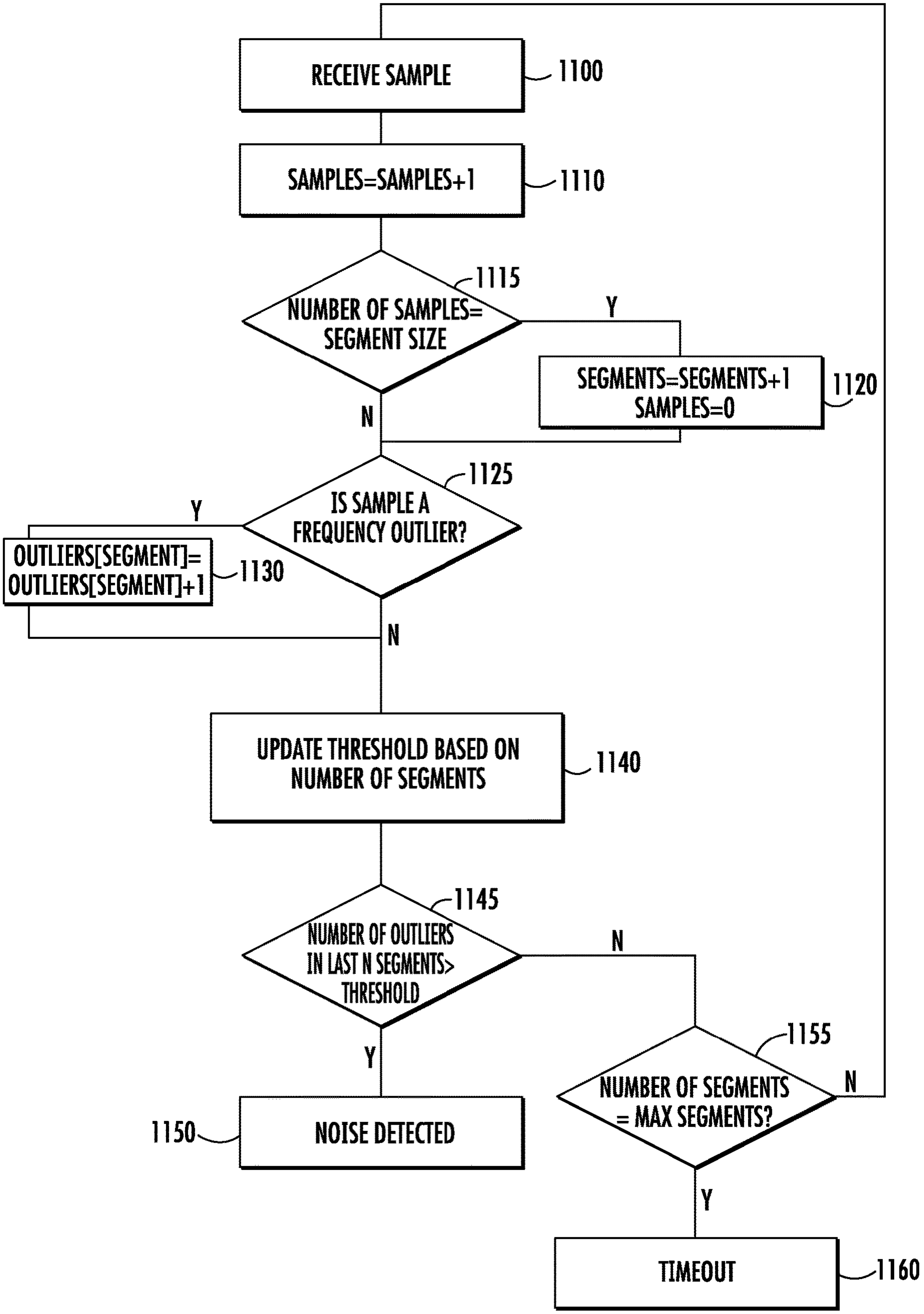
FIG. 11 shows the operation of the noise detector when using the detection window of FIG. 10.

This is shown in FIGS. 10 and 11. First, as shown in Box 1100, a new sample is received. As described above, this sample may be a value that represents a frequency of the incoming signal. Then, in Box 1110, the number of samples received is incremented. Decision Box 1115 checks if the number of samples is equal to the size of a window segment 1010. If so, the number of window segments received is incremented and the sample count is reset, as shown in Box 1120. In either scenario, the noise detector 100 then compares the sample to the allowable frequency values, as explained above and shown in Decision Box 1125. If the sample is outside the allowable frequency range, the number of frequency outliers for this window segment 1010 is incremented, as shown in Box 1130. The noise detector 100 updates the threshold based on the number of window segments 1010 that have been received, as shown in Box 1140. For example, a first threshold may be used when there are fewer than M window segments, while a second threshold may be used if there are greater than M window segments that have been received. The noise detector 100 then compares the number of frequency outliers received in the last N window segments to the threshold, as shown in Decision Box 1145. If the number of frequency outliers exceeds the threshold, the noise detector 100 reports that noise has been detected, as shown in Box 1150. If the number of frequency outliers is less than the threshold, the noise detector 100 checks if all of the window segments 1010 have been received, as shown in Decision Box 1155. If so, the noise detector 100 terminates operation and reports a timeout, as shown in Box 1160. If all of the window segments have not been received yet, the sequence is repeated. Thus, in this embodiment, the predetermined time period described in FIG. 4 refers to the maximum number of window segments 1010 that are processed before the noise detector 100 reports a timeout.

Further, as noted above, in some embodiments, the number of frequency outliers is compared to the threshold only after a full window has been received. In other embodiments, such as described above, the number of frequency outliers is compared to the threshold after each sample.

As a specific example, assume that the window segment 1010 is 1 μsec, the initial detection window 1000 is 4 μsec and the final detection window 1020 is 8 μsec. In this example, the first threshold may be used when 4 or fewer window segments 1010 have been received. The second threshold may be used when more than 4 window segments 1010 have been received. Further, the detection window slides once it reaches 8 μsec.

In another example, assume that the window segment 1010 is 1 μsec, the initial detection window 1000 is 4 μsec and the final detection window 1020 is 12 μsec. In this example, the first threshold may be used when 4 or fewer window segments 1010 have been received. A second threshold may be used when more than 4 window segments and less than or equal to 8 window segments have been received. A third threshold may be used when more than 8 window segments have been received. Further, the detection window slides once it reaches 12 μsec. Thus, in this example, the detection window grows from 4 μsec, to 8 μsec, to a final window of 12 μsec, which then slides.

Figure 12:
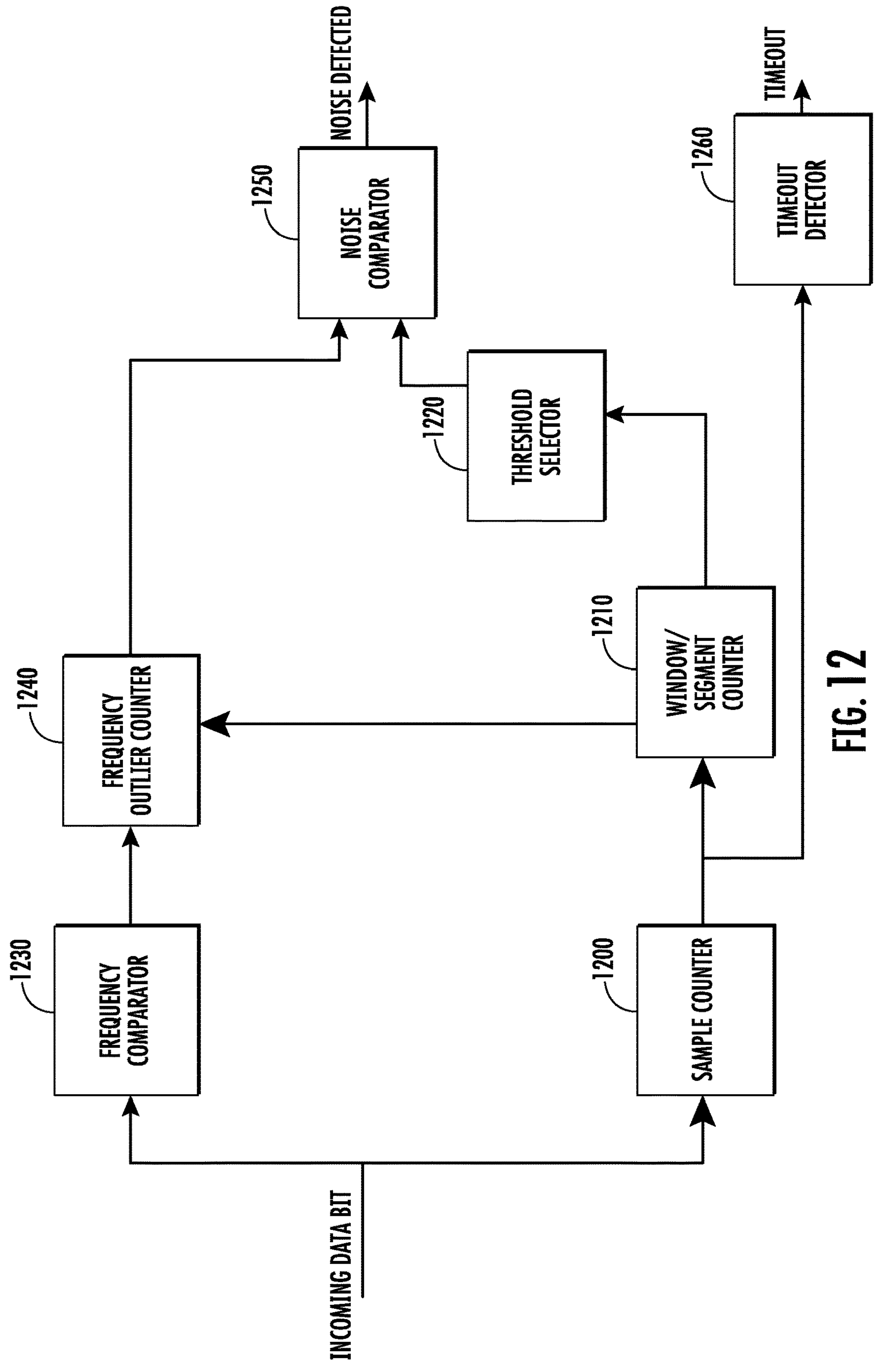
FIG. 12 shows a block diagram of the noise detector.

FIG. 12 shows a block diagram showing the configuration of the noise detectors described in FIGS. 5-6 and 8-11. Note that in certain embodiments, more or fewer components may be used. First, as described above, the incoming data point, which is a value representative of a frequency, is received by the sample counter 1200, which counts the number of data samples that have been received. The incoming data point is also received by a frequency comparator 1230, which compares the value of the data point to a range of expected values. As explained above, data points having values outside the range of expected values are identified as frequency outliers. The output from the frequency comparator 1230 is provided to the frequency outlier counter 1240, which counts the number of frequency outliers. In some embodiments, the frequency outlier counter 1240 counts a total number of frequency outliers; in other embodiments, the frequency outlier counter 1240 counts the number of frequency outliers in each window or segment (as is done in FIGS. 8-11).

Additionally, in some embodiments, the noise detector includes a window/segment counter 1210, which receives the output from the sample counter 1200 and tracks the number of windows or segments that have been received. For example, in FIGS. 5-6, this serves as a window counter, while in FIGS. 8-9, this serves as a segment counter. In certain embodiments, such as that shown in FIGS. 8-9, the output from the window/segment counter 1210 may be provided as an input to the frequency outlier counter 1240 so that the number of frequency outliers per segment can be tracked.

In some embodiments, such as that shown in FIGS. 5-6 and 10-11, the output from the window/segment counter 1210 or the sample counter 1200 may be provided to the threshold selector 1220 so that the threshold may be varied as a function of the number of windows or samples. In other embodiments, such as that shown in FIGS. 8-9, the threshold selector 1220 may not use any inputs; rather, the threshold may be a constant. In either embodiment, the threshold selector 1220 provides a threshold, which is then compared to the output or outputs from the frequency outlier counter 1240 by noise comparator 1250. If the number of frequency outliers is greater than the threshold, then the noise detector 100 asserts the noise detected output 101. Finally, there may be a timeout detector 1260, which is used to indicate that the noise detector did not find noise in the predetermined time duration.

The present system has many advantages. The noise detector allows quick identification of noise. If the noise detector is not present, the scheduler would need to wait until at least enough samples are received for the demodulator to possibly detect the preamble or the synchronization pattern. This increases the time required to recognize the absence of a valid signal significantly. If the wireless device is attempting to scan a plurality of different channels, this extended time may make it impossible to scan all of the channels in a timely fashion. Further, the noise detector is constructed in such a way that the noise detector may operate on a plurality of detection windows, and noise may be detected after each of these detection windows. FIG. 7 shows the probability of detecting noise at various detection times. Note that by providing quick detection, the average time of noise detection is reduced.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A noise detector, comprising:

a sample counter to count a number of data points received, wherein each data point represents a frequency value;

a frequency comparator to compare each data point to an expected range of values, and to detect frequency outliers as those data points having a frequency value outside the expected range f values;

a frequency outlier counter to count a number of frequency outliers;

a threshold selector to select a threshold based on the number of data points received;

a noise comparator to perform a comparison of the number of frequency outliers to the threshold, wherein, if the number of frequency outliers is greater than the threshold, noise is detected.

2. The noise detector of claim 1, wherein the threshold increases for greater numbers of data points received.

3. The noise detector of claim 1, wherein the incoming data points are grouped into windows, wherein the threshold is selected based on a number of windows received.

4. The noise detector of claim 3, wherein the frequency outlier counter counts a total number of frequency outliers detected in all of the windows.

5. The noise detector of claim 3, wherein each window comprises 4 microseconds.

6. The noise detector of claim 3, wherein the threshold comparator performs the comparison after each window is completely filled.

7. The noise detector of claim 1, further comprising a segment counter, wherein the frequency outlier counter counts a number of frequency outliers per segment.

8. The noise detector of claim 7, wherein the noise comparator performs the comparison of the number of frequency outliers received in the last N segments to the threshold.

9. The noise detector of claim 8, wherein N is initially a first value and changes to a second value, larger than the first value.

10. A wireless network device, comprising:

the noise detector of claim 1;

a receive circuit to generate the incoming date points;

a demodulator to detect a packet and receive the packet; and a scheduler in communication with the noise detector and the demodulator, wherein the scheduler changes a frequency channel of the demodulator so as to scan multiple channels sequentially.

11. The wireless network device of claim 10, wherein the scheduler changes the frequency channel if the noise detector indicates that noise was detected.

12. The wireless network device of claim 11, wherein, if the scheduler does not receive an indication from the noise detector within a predetermined time, the schedular checks if the demodulator detects a valid packet.

13. The wireless network device of claim 12, wherein if the scheduler does not receive an indication of a valid packet from the demodulator within a second predetermined time, the scheduler changes the frequency channel.

14. A noise detector, comprising:

a sample counter to count a number of data points received, wherein each data point represents a frequency value;

a frequency comparator to compare each data point to an expected range of values, and to detect frequency outliers as those data points having a frequency value outside the expected range of values;

a window/segment counter to group the incoming data points into a plurality of segments;

a frequency outlier counter to count a number of frequency outliers per segment; and a noise comparator to perform a comparison of the number of frequency outliers in a last N segments to a threshold, wherein, if the number of frequency outliers is greater than the threshold, noise is detected.

15. The noise detector of claim 14, wherein N is constant.

16. The noise detector of claim 14, wherein N is initially a first value and changes to a second value, larger than the first value.

17. A wireless network device, comprising:

the noise detector of claim 14;

a receive circuit to generate the incoming date points;

a demodulator to detect a packet and receive the packet; and a scheduler in communication with the noise detector and the demodulator, wherein the scheduler changes a frequency channel of the demodulator so as to scan multiple channels sequentially.

18. The wireless network device of claim 17, wherein the scheduler changes the frequency channel if the noise detector indicates that noise was detected.

19. The wireless network device of claim 18, wherein, if the scheduler does not receive an indication from the noise detector within a predetermined time, the schedular checks if the demodulator detects a valid packet.

20. The wireless network device of claim 19, wherein if the scheduler does not receive an indication of a valid packet from the demodulator within a second predetermined time, the scheduler changes the frequency channel.

* * * * *